(12) United States Patent
Rached et al.

(10) Patent No.: US 8,679,363 B2
(45) Date of Patent: Mar. 25, 2014

(54) REFRIGERANT FOR HIGH-TEMPERATURE HEAT TRANSFER

(75) Inventors: Wissam Rached, Chaponost (FR); Laurent Abbas, Narberth, PA (US)

(73) Assignee: Arkema France, Colombes (FR)

( * ) Notice: Subject to any disclaimer, the term of this patent is extended or adjusted under 35 U.S.C. 154(b) by 66 days.

(21) Appl. No.: 13/576,417

(22) PCT Filed: Feb. 15, 2011

(86) PCT No.: PCT/FR2011/050316
§ 371 (c)(1),
(2), (4) Date: Aug. 1, 2012

(87) PCT Pub. No.: WO2011/114029
PCT Pub. Date: Sep. 22, 2011

(65) Prior Publication Data
US 2012/0324926 A1    Dec. 27, 2012

(30) Foreign Application Priority Data

Mar. 19, 2010 (FR) ..................... 10 51983

(51) Int. Cl.
*C09K 5/04* (2006.01)
(52) U.S. Cl.
USPC .......................................................... 252/67

(58) Field of Classification Search
USPC .......................................................... 252/67
See application file for complete search history.

(56) References Cited

U.S. PATENT DOCUMENTS

| | | | |
|---|---|---|---|
| 6,814,884 B2 * | 11/2004 | Jannick et al. | 252/67 |
| 7,569,170 B2 * | 8/2009 | Minor | 264/53 |
| 8,048,304 B2 * | 11/2011 | Waibel et al. | 210/634 |
| 8,236,193 B2 * | 8/2012 | Fukushima | 252/67 |
| 2002/0198274 A1 | 12/2002 | Bogdan et al. | |
| 2003/0050356 A1 * | 3/2003 | Bogdan et al. | 521/131 |
| 2009/0049856 A1 | 2/2009 | Sun | |
| 2013/0061612 A1 * | 3/2013 | Shiflett et al. | 62/77 |

* cited by examiner

*Primary Examiner* — John Hardee
(74) *Attorney, Agent, or Firm* — Steven D. Boyd

(57) ABSTRACT

The invention relates to a method of heat transfer by means of a vapor compression circuit containing a heat transfer fluid, said method including, consecutively, evaporating the heat transfer fluid, compressing the heat transfer fluid, condensing the heat transfer fluid to a temperature greater than or equal to 70° C., and decompressing the heat transfer fluid. In said method, the heat transfer fluid includes 1,1,1,3,3-pentafluorobutane and 1,1,1,3,3-pentafluoropropane, the compounding weight ratio of 1,1,1,3,3-pentafluorobutane in the fluid being no higher than 20%. The invention also relates to a heat transfer fluid suitable for implementing said method and to a facility that is also suitable for implementing said method.

14 Claims, No Drawings

REFRIGERANT FOR HIGH-TEMPERATURE HEAT TRANSFER

FIELD OF THE INVENTION

The present invention relates to a refrigerant suitable for use at a high condensation temperature and in particular for use in a high-temperature heat pump.

TECHNICAL BACKGROUND

Fluids based on fluorocarbon compounds are widely used in many industrial devices, in particular air conditioning, heat pump or refrigeration devices. A feature that these devices have in common is that they are based on a thermodynamic cycle comprising the evaporation of the fluid at low pressure (in which the fluid absorbs heat); the compression of the evaporated fluid up to a high pressure; the condensation of the evaporated fluid to give a liquid at high pressure (in which the fluid discharges heat); and the reduction in pressure of the fluid to complete the cycle.

The choice of a heat-transfer fluid (which can be a pure compound or a mixture of compounds) is dictated, on the one hand, by the thermodynamic properties of the fluid and, on the other hand, by additional constraints. Thus, a particularly important criterion is that of the impact on the environment of the fluid under consideration. In particular, chlorinated compounds (chlorofluorocarbons and hydrochlorofluorocarbons) exhibit the disadvantage of damaging the ozone layer. Thus, henceforth, nonchlorinated compounds, such as hydrofluorocarbons, fluoroethers and fluoroolefins, are generally preferred to them.

The existing heat-transfer devices include in particular high-temperature heat pumps (that is to say, heat pumps with a condensation temperature of greater than or equal to 70° C., indeed even of greater than or equal to 80° C.). These devices are of use in particular in industry, for giving added value to hot streams.

However, high-temperature heat pumps present particular design problems.

This is because the temperature and pressure constraints in the systems of this type are such that few fluids can be used. Thus, fluids such as HFC-134a, which are used for heat transfer in other applications, are not suitable as they exhibit critical temperatures lower than the condensation temperature and thus have very poor performances for high-temperature heat transfer.

The heat-transfer compound conventionally used for high-temperature heat pumps was CFC-114 (dichlorofluoroethane). This compound has to be replaced due to its impact on the environment.

The document U.S. Pat. No. 6,814,884 describes the use of 1,1,1,3,3-pentafluorobutane (HFC-365mfc) in combination with at least one additional compound chosen from 1,1,1,2-tetrafluoroethane (HFC-134a), pentafluoroethane (HFC-125), 1,1,1,3,3-pentafluoropropane (HFC-245fa) and 1,1,1,2,3,3,3-heptafluoropropane (HFC-227ea). The HFC-365mfc is present at a level of 40 to 95% by weight and the additional compound at a level of 5 to 60% by weight. A concrete example is provided with 75% of HFC-365mfc and 25% of HFC-227ea, by weight.

Furthermore, the document US 2009/0049856 describes the use of ternary mixtures for high-temperature heat transfer. These ternary mixtures comprise 1,1,1,2-tetrafluoroethane (HFC-134a), 1,1,1,2,3,3-hexafluoropropane (HFC-236ea) and 1,1,1,3,3-pentafluoropropane (HFC-245fa).

However, the heat-transfer fluids provided in the state of the art for high-temperature heat pumps are still insufficiently effective.

There thus exists a real need to find a heat-transfer fluid which makes it possible to carry out more effective high-temperature heat transfer than the heat-transfer fluids in the state of the art (and which makes it possible in particular to devise high-temperature heat pumps which are more efficient than those of the state of the art), while limiting the negative impact on the environment.

SUMMARY OF THE INVENTION

The invention relates first to a process for heat transfer using a vapor compression circuit containing a heat-transfer fluid, successively comprising the evaporation of the heat-transfer fluid, the compression of the heat-transfer fluid, the condensation of the heat fluid at a temperature greater than or equal to 70° C. and the reduction in pressure of the heat-transfer fluid, in which the heat-transfer fluid comprises 1,1,1,3,3-pentafluorobutane and 1,1,1,3,3-pentafluoropropane, the proportion by weight of 1,1,1,3,3-pentafluorobutane in the heat-transfer fluid being less than or equal to 20%.

According to one embodiment, the condensation of the heat-transfer fluid is carried out at a temperature of 70 to 150° C., preferably of 90 to 140° C.

According to one embodiment, the abovementioned process is a process for heating a fluid or a body, and the vapor compression circuit forms a heat pump.

According to one embodiment, the proportion by weight of 1,1,1,3,3-pentafluorobutane in the heat-transfer fluid is from 2 to 16%, preferably from 5 to 13% and more particularly preferably from 8 to 10%.

According to one embodiment, the proportion by weight of 1,1,1,3,3-pentafluorobutane and 1,1,1,3,3-pentafluoropropane in the heat-transfer fluid is greater than or equal to 97%.

The invention also relates to a heat-transfer fluid suitable for the implementation of the above process comprising 1,1,1,3,3-pentafluorobutane and 1,1,1,3,3-pentafluoropropane, the proportion by weight of 1,1,1,3,3-pentafluorobutane being less than or equal to 20%.

According to one embodiment, the proportion by weight of 1,1,1,3,3-pentafluorobutane is from 2 to 16%, preferably from 5 to 13% and more particularly preferably from 8 to 10%.

According to one embodiment, the proportion by weight of 1,1,1,3,3-pentafluorobutane and 1,1,1,3,3-pentafluoropropane is greater than or equal to 97%.

The invention also relates to a heat-transfer composition comprising the abovementioned heat-transfer fluid and one or more additives chosen from lubricants, stabilizing agents, surfactants, tracing agents, fluorescent agents, odorous agents, solubilizing agents and their mixtures.

The invention also relates to a heat-transfer plant comprising a vapor compression circuit containing the abovementioned heat-transfer fluid or the abovementioned heat-transfer composition.

According to one embodiment, this plant is a heat pump plant.

The present invention makes it possible to overcome the disadvantages of the state of the art. It more particularly provides a heat-transfer fluid which makes it possible to carry out an efficient high-temperature heat transfer; by virtue of this heat-transfer fluid, it is possible to efficiently operate high-temperature heat pumps without a significantly negative impact on the environment.

DESCRIPTION OF EMBODIMENTS OF THE INVENTION

The invention is now described in more detail and without implied limitation in the following description.

The term "heat-transfer compound", respectively "heat-transfer fluid" (or refrigerant), is understood to mean a compound, respectively a fluid, capable of absorbing heat by evaporating at low temperature and low pressure and of discharging heat by condensing at high temperature and high pressure, in a vapor compression circuit. Generally, a heat-transfer fluid can comprise just one, two, three or more than three heat-transfer compounds.

The term "heat-transfer composition" is understood to mean a composition comprising a heat-transfer fluid and optionally one or more additives which are not heat-transfer compounds for the application envisaged.

The heat-transfer process of the invention is based on the use of a vapor compression circuit comprising a heat-transfer fluid. The heat-transfer process can be a process in which a fluid or a body is heated or cooled.

The vapor compression circuit containing a heat-transfer fluid comprises at least one evaporator, one compressor, one condenser and one expansion device, and also lines for transporting heat-transfer fluid between these components.

Use may in particular be made, as compressor, of a single-stage or multistage centrifugal compressor or a centrifugal minicompressor. Rotary, piston or screw compressors can also be used. The compressor can be driven by an electric motor or by a gas turbine (for example fed by the exhaust gases from a vehicle, for mobile applications) or by gears.

The plant can comprise a coupling of the expansion device to a turbine in order to generate electricity (Rankine cycle).

The plant can also optionally comprise at least one heat-exchange fluid circuit used to send heat (with or without change in state) between the heat-transfer fluid circuit and the fluid or body to be heated or cooled.

The plant can also optionally comprise two (or more) vapor compression circuits containing identical or distinct heat-transfer fluids. For example, the vapor compression circuits can be coupled to one another.

The vapor compression circuit operates according to a conventional vapor compression cycle. The cycle comprises the change in state of the heat-transfer fluid from a liquid phase (or liquid/vapor two-phase system) to a vapor phase at a relatively low pressure, then the compression of the fluid in the vapor phase up to a relatively high pressure, the change in state (condensation) of the heat-transfer fluid from the vapor phase to the liquid phase at a relatively high pressure, and the reduction in the pressure in order to recommence the cycle.

In the case of a cooling process, heat resulting from the fluid or body which is cooled (directly or indirectly, via a heat-exchange fluid) is absorbed by the heat-transfer fluid, during the evaporation of the latter, this taking place at a relatively low temperature with respect to the environment.

In the case of a heating process, heat is given up (directly or indirectly, via a heat-exchange fluid) by the heat-transfer fluid, during the condensation of the latter, to the fluid or body which is heated, this taking place at a relatively high temperature with respect to the environment. The plant which makes it possible to carry out the heat transfer is known in this case as a "heat pump". The invention is of particular use for such heat pump systems.

The invention relates to a high-temperature heat transfer process, that is to say that for which the condensation temperature of the heat-transfer fluid is greater than or equal to 70° C., or even greater than or equal to 80° C. Generally, the condensation temperature is less than or equal to 150° C. Preferably, the condensation temperature is from 90 to 140° C.

According to the invention, the heat-transfer fluid comprises at least two heat-transfer compounds, namely 1,1,1,3,3-pentafluorobutane (HFC-365mfc) and 1,1,1,3,3-pentafluoropropane (HFC-245fa).

According to one embodiment, the heat-transfer fluid is of binary type, that is to say that it does not comprise another heat-transfer compound in addition to the HFC-365mfc and HFC-245fa (apart from the impurities). However, according to another embodiment, the heat-transfer fluid comprises one or more additional heat-transfer compounds, in particular hydrocarbons, in a proportion by weight of less than or equal to 5% and preferably of less than or equal to 3%. Mention may be made, as example of additional heat-transfer compound, of isopentane, which has the advantage of increasing the miscibility of the compounds.

The heat-transfer fluid according to the invention advantageously comprises:
  from 1 to 20% of HFC-365mfc and from 80 to 99% of HFC-245fa, by weight;
  more particularly from 2 to 16% of HFC-365mfc and from 84 to 98% of HFC-245fa, by weight;
  more particularly from 5 to 13% of HFC-365mfc and from 87 to 95% of HFC-245fa, by weight; and
  more particularly from 8 to 10% of HFC-365mfc and from 90 to 92% of HFC-245fa, by weight.

This is because such binary mixtures exhibit a better coefficient of performance, for the application under consideration, than the heat-transfer fluids of the state of the art.

It can be particularly advantageous to have available a nonflammable (according to Standard ASTM E681) heat-transfer fluid. This is the case when the HFC-365mfc content of the binary mixture is less than or equal to 9.4% and in particular when it is less than or equal to 9%.

The heat-transfer fluid can be mixed with one or more additives in order to provide the heat-transfer composition circulating in the vapor compression circuit. The additives can be chosen in particular from lubricants, stabilizing agents, surfactants, tracing agents, fluorescent agents, odorous agents, solubilizing agents and their mixtures.

The stabilizing agent or agents, when they are present, preferably represent at most 5% by weight in the heat-transfer composition. Mention may in particular be made, among stabilizing agents, of nitromethane, ascorbic acid, terephthalic acid, azoles, such as tolutriazole or benzotriazole, phenolic compounds, such as tocopherol, hydroquinone, (t-butyl)hydroquinone or 2,6-di(tert-butyl)-4-methylphenol, epoxides (alkyl, which is optionally fluorinated or perfluorinated, alkenyl or aromatic), such as n-butyl glycidyl ether, hexanediol diglycidyl ether, allyl glycidyl ether or butylphenyl glycidyl ether, phosphites, phosphonates, thiols and lactones.

Use may in particular be made, as lubricants, of oils of mineral origin, silicone oils, paraffins, naphthenes, synthetic paraffins, alkylbenzenes, poly(α-olefin)s, polyalkene glycols, polyol esters and/or polyvinyl ethers.

Mention may be made, as tracing agents (agents capable of being detected), of hydrofluorocarbons, deuterated hydrofluorocarbons, deuterated hydrocarbons, perfluorocarbons, fluoroethers, brominated compounds, iodinated compounds, alcohols, aldehydes, ketones, nitrous oxide and the combinations of these. The tracing agent is different from the heat-transfer compound or compounds making up the heat-transfer fluid.

Mention may be made, as solubilizing agents, of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat-transfer compound or compounds making up the heat-transfer fluid.

Mention may be made, as fluorescent agents, of naphthalimides, perylenes, coumarins, anthracenes, phenanthracenes, xanthenes, thioxanthenes, naphthoxanthenes, fluoresceins and the derivatives and combinations of these.

Mention may be made, as odorous agents, of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl)phenol and the combinations of these.

EXAMPLES

The following examples illustrate the invention without limiting it.

Example 1

Method for Calculating the Properties of the Heat-Transfer Fluids

The RK-Soave equation is used for the calculation of the densities, enthalpies, entropies and liquid/vapor equilibrium data of the mixtures. The use of this equation requires knowledge of the properties of the pure substances used in the mixtures in question and also the interaction coefficients for each binary mixture.

The data necessary for each pure substance are the boiling point, the critical temperature and pressure, the pressure curve as a function of the temperature from the boiling point up to the critical point, and the saturated liquid and saturated vapor densities as a function of the temperature.

The data with regard to HFC-245fa are published in the ASHRAE Handbook 2005, Chapter 20, and are also available under Refprop (software developed by NIST for the calculation of the properties of refrigerants).

The data with regard to HFC-365mfc are available under Refprop (software developed by NIST for the calculation of the properties of refrigerants).

The RK-Soave equation uses binary interaction coefficients to represent the behavior of the products as mixtures. The coefficients are calculated as a function of the liquid-vapor equilibrium experimental data.

The technique used for the liquid/vapor equilibrium measurements is the analytical static cell method. The equilibrium cell comprises a sapphire tube and is equipped with two Rolsi™ electromagnetic samplers. It is immersed in a cryo-thermostat bath (Huber HS40). Magnetic stirring driven by a field rotating at a variable speed is used to accelerate the achievement of the equilibrii. The samples are analyzed by gas chromatography (HP5890 series II) using a catharometer (TCD).

The liquid/vapor equilibrium measurements on the HFC-245fa/HFC-365mfc binary mixture are carried out for the following isotherm: 100° C.

Example 2

Condensation at 90° C.

A compression system equipped with an evaporator, a condenser, a compressor, an internal exchanger and an expansion device is considered. The system operates with 5° C. of excess heating and an isentropic efficiency of 59.3%.

In this example, the compression system operates between an evaporation temperature of the refrigerant in the evaporator of 30° C. and a condensation temperature of the refrigerant in the condenser of 90° C.

The performances of the compositions according to the invention are given in table 1 below. The values of the constituents (HFC-245fa, HFC-365mfc) for each composition are given as percentage by weight.

In this table:
Temp inlet evap is the temperature at the inlet of the evaporator;
Temp outlet comp is the temperature at the outlet of the compressor;
T inlet cond is the temperature at the inlet of the condenser;
evap P is the pressure in the evaporator;
cond P is the pressure in the condenser;
Ratio (w/w) is the compression ratio;
Glide is the temperature glide;
% CAPc is the ratio of the cubic capacity obtained with the fluid under consideration with respect to the reference cubic capacity obtained with HFC-114;
% COP is the ratio of the coefficient of performance obtained with the fluid under consideration with respect to the coefficient of performance obtained with HFC-114 (the coefficient of performance being defined as being the useful power supplied by the system with regard to the power introduced or consumed by the system).

TABLE 1

Performances obtained with a condensation temperature of 90° C.

| | | Temp inlet evap (° C.) | Temp outlet comp (° C.) | T inlet cond (° C.) | evap P (bar) | cond P (bar) | Ratio (w/w) | Glide | % CAPc | % COP |
|---|---|---|---|---|---|---|---|---|---|---|
| HFC-114 | | 30 | 96 | 90 | 2.5 | 11.5 | 4.6 | 0.00 | 100 | 100 |
| 75 wt % 365mfc/25 wt % 227ea | | 25 | 104 | 104 | 0.9 | 7.9 | 9.1 | 4.53 | 45 | 90 |
| 245fa/236ea/134a (10/10/80 wt %) | | 30 | | 113 | 6.0 | 27.4 | 4.6 | 3.28 | | 99 |
| HFC-245fa | HFC-365mfc | | | | | | | | | |
| 98 | 2 | 30 | 103 | 91 | 1.7 | 10.0 | 5.9 | 0.38 | 83 | 104 |
| 96 | 4 | 29 | 103 | 91 | 1.6 | 9.9 | 6.0 | 0.71 | 81 | 103 |
| 94 | 6 | 29 | 104 | 92 | 1.6 | 9.7 | 6.1 | 1.00 | 79 | 103 |
| 92 | 8 | 29 | 104 | 92 | 1.6 | 9.6 | 6.2 | 1.24 | 78 | 102 |

TABLE 1-continued

Performances obtained with a condensation temperature of 90° C.

| | Temp inlet evap (° C.) | Temp outlet comp (° C.) | T inlet cond (° C.) | evap P (bar) | cond P (bar) | Ratio (w/w) | Glide | % CAPc | % COP |
|---|---|---|---|---|---|---|---|---|---|
| 90 | 10 | 29 | 104 | 92 | 1.5 | 9.5 | 6.2 | 1.46 | 76 | 102 |
| 88 | 12 | 28 | 104 | 93 | 1.5 | 9.3 | 6.3 | 1.65 | 74 | 102 |
| 86 | 14 | 28 | 104 | 93 | 1.4 | 9.2 | 6.4 | 1.82 | 73 | 102 |
| 84 | 16 | 28 | 104 | 93 | 1.4 | 9.1 | 6.4 | 1.96 | 71 | 101 |
| 82 | 18 | 28 | 103 | 93 | 1.4 | 8.9 | 6.5 | 2.09 | 70 | 101 |

It is found that the performances obtained with the transfer fluid according to the invention are better than with the heat-transfer fluids of the state of the art, in particular the binary mixture of 75% HFC-365mfc and 25% HFC-227ea described in the document U.S. Pat. No. 6,814,884 and the ternary mixture of 10% HFC-245fa, 10% HFC-236ea and 80% HFC-134a described in the document US 2009/0049856.

Example 3

Condensation at 140° C.

The compression system operates in the same way as in example 2, except that the evaporation temperature of the fluid in the evaporator is 80° C. and that the condensation temperature of the fluid in the condenser is 140° C.

The performances of the compositions according to the invention are given in table 2 below. The values of the constituents (HFC-245fa, HFC-365mfc) for each composition are given as percentage by weight. The abbreviations in table 2 have the same meaning as those in table 1.

TABLE 2

Performances obtained with a condensation temperature of 140° C.

| | | Temp inlet evap (° C.) | Temp outlet comp (° C.) | T inlet cond (° C.) | evap P (bar) | cond P (bar) | Ratio (w/w) | Glide | % CAP | % COP |
|---|---|---|---|---|---|---|---|---|---|---|
| R114 | | 80.0 | 148 | 140 | 9.3 | 29.6 | 3.2 | 0.00 | 100 | 100 |
| HFC-245fa | | 80.0 | 147 | 140 | 7.9 | 28.6 | 3.6 | 0.00 | 114 | 119 |
| HFC-365mfc | | 80.0 | 140 | 140 | 3.5 | 14.1 | 4.0 | 0.00 | 71 | 151 |
| 75 wt % 365mfc/25 wt % 227ea | | 77.2 | 148 | 149 | 4.3 | 20.7 | 4.8 | 2.80 | 78 | 124 |
| HFC-245fa | HFC-365mfc | | | | | | | | | |
| 98 | 2 | 79.7 | 148 | 140 | 7.7 | 28.2 | 3.7 | 0.33 | 113 | 120 |
| 96 | 4 | 79.4 | 148 | 141 | 7.5 | 27.7 | 3.7 | 0.58 | 112 | 121 |
| 94 | 6 | 79.2 | 148 | 141 | 7.3 | 27.3 | 3.7 | 0.78 | 111 | 122 |
| 92 | 8 | 79.1 | 147 | 141 | 7.1 | 26.9 | 3.8 | 0.94 | 110 | 123 |
| 90 | 10 | 78.9 | 147 | 142 | 7.0 | 26.5 | 3.8 | 1.08 | 109 | 123 |
| 88 | 12 | 78.8 | 147 | 142 | 6.8 | 26.1 | 3.8 | 1.19 | 108 | 124 |
| 86 | 14 | 78.7 | 147 | 142 | 6.7 | 25.7 | 3.9 | 1.29 | 107 | 125 |
| 84 | 16 | 78.6 | 147 | 142 | 6.5 | 25.3 | 3.9 | 1.37 | 106 | 126 |
| 82 | 18 | 78.6 | 147 | 142 | 6.4 | 25.0 | 3.9 | 1.45 | 105 | 126 |
| 80 | 20 | 78.5 | 147 | 142 | 6.3 | 24.6 | 3.9 | 1.52 | 104 | 127 |

The heat-transfer fluid exhibits a high capacity (greater than 100) and a better coefficient of performance than the fluids of the state of the art, in particular the binary mixture of 75% HFC-365mfc and 25% HFC-227ea described in the document U.S. Pat. No. 6,814,884 and the ternary mixture of 10% HFC-245fa, 10% HFC-236ea and 80% HFC-134a described in the document US 2009/0049856.

The invention claimed is:

1. A process for heat transfer using a vapor compression circuit containing a heat-transfer fluid, successively comprising evaporating of the heat-transfer fluid, compressing of the heat-transfer fluid, condensing of the heat fluid at a temperature greater than or equal to 70° C. and reducing the pressure of the heat-transfer fluid, in which the heat-transfer fluid comprises 1,1,1,3,3-pentafluorobutane and 1,1,1,3,3-pentafluoropropane, the proportion by weight of 1,1,1,3,3-pentafluorobutane in the heat-transfer fluid being less than or equal to 20% and in which the proportion by weight of 1,1,1,3,3-pentafluorobutane and 1,1,1,3,3-pentafluoropropane in the heat-transfer fluid is greater than or equal to 97%.

2. The process as claimed in claim 1, in which the condensing of the heat-transfer fluid is carried out at a temperature of 70 to 150° C.

3. The process as claimed in claim 1, which is a process for heating a fluid or a body, and in which the vapor compression circuit comprises a heat pump.

4. The process as claimed in claim 1, in which the proportion by weight of 1,1,1,3,3-pentafluorobutane in the heat-transfer fluid is from 2 to 16%.

5. The process as claimed in claim 1, in which the condensing of the heat-transfer fluid is carried out at a temperature of 90 to 140° C.

6. The process as claimed in claim 1, in which the proportion by weight of 1,1,1,3,3-pentafluorobutane in the heat-transfer fluid is from 5 to 13%.

7. The process as claimed in claim 1, in which the proportion by weight of 1,1,1,3,3-pentafluorobutane in the heat-transfer fluid is from 8 to 10%.

8. A heat-transfer fluid comprising 1,1,1,3,3-pentafluorobutane and 1,1,1,3,3-pentafluoropropane, the proportion by weight of 1,1,1,3,3-pentafluorobutane being less than or equal to 20% and in which the proportion by weight of 1,1,1,3,3-pentafluorobutane and 1,1,1,3,3pentafluoropropane in the heat-transfer fluid is greater than or equal to 97%.

9. The heat-transfer fluid as claimed in claim 8, in which the proportion by weight of 1,1,1,3,3-pentafluorobutane is from 8 to 10%.

10. The heat-transfer fluid as claimed in claim 8, in which the proportion by weight of 1,1,1,3,3-pentafluorobutane is from 5 to 13%.

11. The heat-transfer fluid as claimed in claim 8, in which the proportion by weight of 1,1,1,3,3-pentafluorobutane is from 2 to 16%.

12. A heat-transfer composition comprising the heat-transfer fluid as claimed in claim 8, further comprising one or more additives selected from the group consisting of lubricants, stabilizing agents, surfactants, tracing agents, fluorescent agents, odorous agents, solubilizing agents and their mixtures.

13. A heat-transfer plant comprising a vapor compression circuit containing a heat-transfer fluid as claimed in claim 8.

14. The heat-transfer plant as claimed in claim 13, which is a heat pump plant.

* * * * *